(12) United States Patent
Edsall et al.

(10) Patent No.: US 8,882,046 B2
(45) Date of Patent: Nov. 11, 2014

(54) SENSOR POD MOUNT FOR AN AIRCRAFT

(75) Inventors: Eric Edsall, Eugene, OR (US);
Alejandro Pita, White Salmon, WA (US); Jeff Turney, Reno, NV (US)

(73) Assignee: Fidelitad, Inc., White Salmon, WA (US)

( * ) Notice: Subject to any disclaimer, the term of this patent is extended or adjusted under 35 U.S.C. 154(b) by 81 days.

(21) Appl. No.: 13/372,230

(22) Filed: Feb. 13, 2012

(65) Prior Publication Data

US 2013/0206914 A1    Aug. 15, 2013

(51) Int. Cl.
*B64D 1/12* (2006.01)

(52) U.S. Cl.
USPC ........................................................ 244/137.4

(58) Field of Classification Search
CPC ............. B64D 47/08; B64D 1/22; B64D 9/00
USPC ...................... 244/118.1, 118.2, 137.4, 129.1
See application file for complete search history.

(56) References Cited

U.S. PATENT DOCUMENTS

| | | | | |
|---|---|---|---|---|
| 3,656,164 A | * | 4/1972 | Rempt ........................... | 343/705 |
| 3,689,012 A | | 9/1972 | Liston | |
| 3,904,155 A | | 9/1975 | Chavis | |
| 3,917,199 A | * | 11/1975 | Dewitt ............................ | 396/13 |
| 4,509,709 A | * | 4/1985 | Utton et al. ................. | 244/118.1 |
| 4,746,082 A | * | 5/1988 | Syms et al. ................. | 244/137.4 |
| 4,825,232 A | | 4/1989 | Howdle | |
| 5,426,476 A | | 6/1995 | Fussell et al. | |
| 5,476,238 A | * | 12/1995 | Parker ........................ | 244/137.4 |
| 5,927,648 A | * | 7/1999 | Woodland ................... | 244/118.1 |
| 6,542,181 B1 | | 4/2003 | Houska et al. | |
| 6,616,097 B2 | * | 9/2003 | Hilbert ........................ | 244/118.1 |
| 6,745,981 B1 | * | 6/2004 | Rainer et al. ................ | 244/118.1 |
| 7,520,467 B2 | * | 4/2009 | Gioffre et al. ............... | 244/118.1 |
| 7,806,368 B1 | * | 10/2010 | Smith et al. ................. | 244/129.5 |
| 2003/0048357 A1 | | 3/2003 | Kain et al. | |
| 2004/0155959 A1 | | 8/2004 | Cullens | |
| 2004/0257441 A1 | | 12/2004 | Pevear et al. | |

OTHER PUBLICATIONS

"CAP pilots to fly 'Surrogate Predators," Janice Wood, https://www.generalaviationnews.com/2009/09/14/cap-pilots-to-fly-%e2%80%98surrogate-predators%e2%80%99/, Sep. 14, 2009.
"Company History—Digital Aerial Imaging," Geovantage, Inc. http://www.geovantage.com/about-us/history/, Accessed May 20, 2011.
"Aerial Imagery Technology—GPS, IMU in Digital Sensors," Geovantage, Inc. http://www.geovantage.com/cameras/technology/, Accessed Oct. 10, 2011.
"Aerial Camera—Distributed Sensor, IMU & GPS Equipped," Geovantage, Inc. http://www.geovantage.com/cameras/, Accessed Oct. 10, 2011.
"Special Missions," Textron, Inc., http://www.cessna.com/single-engine/special-missions.html, Accessed Feb. 13, 2012.

(Continued)

*Primary Examiner* — Tien Dinh
*Assistant Examiner* — Keith L Dixon
(74) *Attorney, Agent, or Firm* — Alleman Hall McCoy Russell & Tuttle LLP

(57) ABSTRACT

Embodiments related to mounting a sensor pod mount to an aircraft fuselage are disclosed. In one example embodiment, a sensor pod mount comprises a sensor pod mounting body where the sensor pod mounting body includes a mounting region for removably mounting the sensor pod mount to the fuselage using a coupling that joins a strut to the fuselage.

19 Claims, 4 Drawing Sheets

(56) References Cited

OTHER PUBLICATIONS

"Aircraft & Helicopter Surveillance Services," North American Surveillance Systems, http://www.nassusa.net/air-surveillance-company.html, Accessed Oct. 11, 2011.

Photographs of an Infrared Surveillance System Mounted to an Aircraft Using Clamps Manufactured by North American Surveillance Systems Available at Least as Early as Aug. 17, 2011, 3 pages.

Photographs of a Through-Fuselage Mounting System Manufactured by North American Surveillance Systems Available at Least as Early as Sep. 14, 2009, 3 pages.

Photographs of a Surveillance System Mounted to an Aircraft Via a Through-Fuselage Mounting System Manufactured by North American Surveillance Systems Available at Least as Early as Jul. 11, 2011, 6 pages.

A Photograph of a Surveillance System Mounted to an Aircraft Via a Through-Fuselage Mounting System Manufactured by North American Surveillance Systems Available at Least as Early as Dec. 15, 2010, 2 pages.

Photographs of Aircraft-Mounted Surveillance Systems Manufactured by Cloud Cap Technology Available at Least as Early as Apr. 2011, 4 pages.

* cited by examiner

AXIS PARALLEL TO LONGITUDINAL AXIS OF FUSELAGE

ZERO DEGREE POSITION

THIRTY DEGREE POSITION

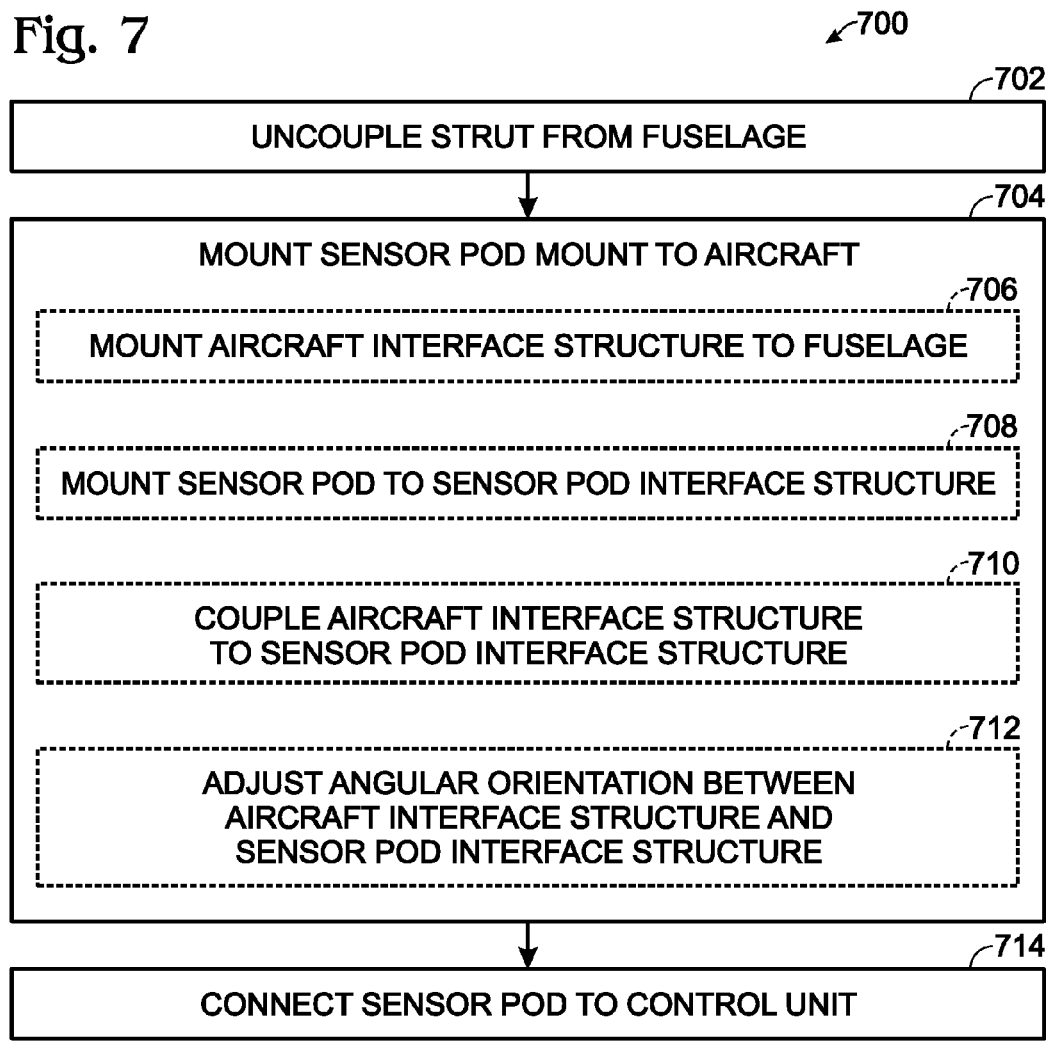

SENSOR POD MOUNT FOR AN AIRCRAFT

BACKGROUND

It can be difficult to mount a sensor to an aircraft. In some approaches, mounting a sensor to an aircraft may involve drilling holes in the aircraft so that the sensor may be secured to the aircraft. Making such permanent modifications to the aircraft may be expensive and, in some settings, may alter the aircraft's capabilities.

SUMMARY

Embodiments related to mounting a sensor pod mount to an aircraft fuselage are disclosed. For example, one disclosed embodiment comprises a sensor pod mount for mounting a sensor pod to a fuselage of an aircraft. The embodiment further comprises a sensor pod mounting body including a mounting region for removably mounting the sensor pod mount to the fuselage using a coupling that joins a strut to the fuselage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 shows a flowchart for a method of mounting a sensor pod to an aircraft according to an embodiment of the present disclosure.

DETAILED DESCRIPTION

Figure 1:
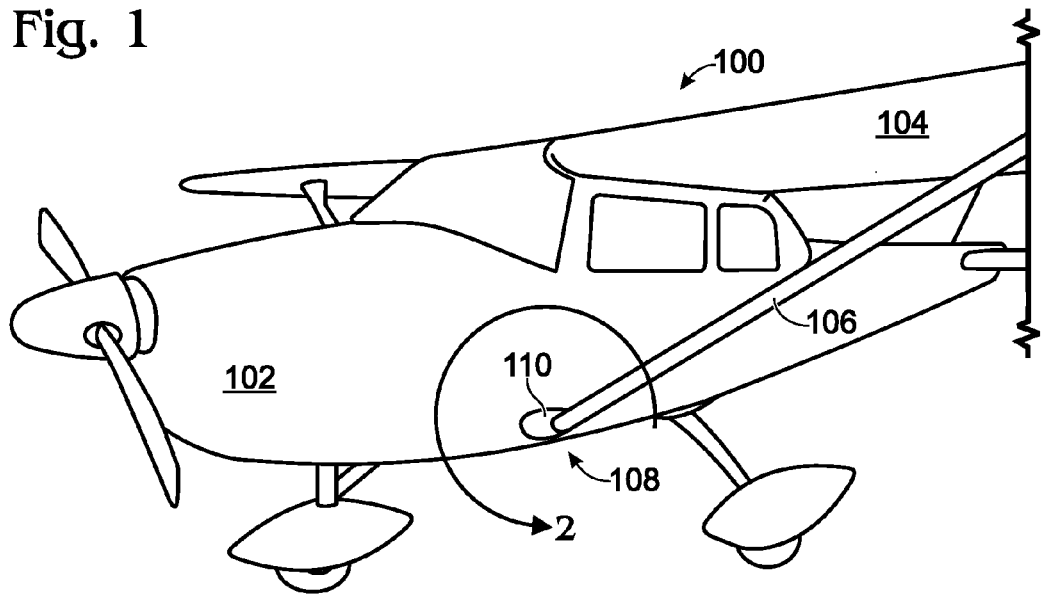
FIG. 1 somewhat schematically shows a portion of an aircraft to which a sensor pod may be mounted according to an embodiment of the present disclosure.

Aircraft-mounted sensors are often utilized to collect data and information that may not be obtained readily using ground-level collection techniques. For example, aircraft-mounted sensors may be used to collect geographic data, environmental data, surveillance data, and so on from an overhead perspective, potentially providing a bird's eye view of the landscape and structures over which the aircraft flies.

However, it can be difficult to mount an external sensor to an aircraft. Some previous approaches for mounting sensors or sensor-holding package to an aircraft's exterior include drilling mounting holes in the aircraft fuselage. However, making such modifications to the fuselage may cause a regulatory body to recertify the aircraft prior to flight. Such steps may be expensive, may potentially affect the aircraft's ability to operate under some conditions (e.g., altitude, weather, and so on), and may be specific to a particular type of sensor. Further, in some settings, adding openings to an aircraft fuselage may compromise the aircraft's ability to perform other missions (e.g., personnel and/or cargo transportation), potentially reducing the value of the aircraft. Such consequences may cause users to modify just a few aircraft to carry external sensors. Thus, when such aircraft are not available (e.g., for maintenance or other reasons), users may not be able to collect sensor data.

Further, in some cases, a sensor package may be mounted on a portion of an aircraft that is distant from the aircraft fuselage, such as a position on a wing or a step that is not proximal to the fuselage. While such approaches may potentially prevent the fuselage from interfering with data collection, locating the sensor package in such locations may affect the type of sensor that may be carried by the aircraft. For example, a sensor package mounted away from the fuselage may create a load (such as a bending moment) that exceeds a carrying capacity of a structure to which the sensor package is mounted. Further, sensor packages mounted away from the fuselage may alter the aerodynamics and/or flight dynamics of the aircraft to an extent that the maneuverability or other capabilities of the aircraft may be adversely affected.

Thus, the disclosed embodiments relate to mounting a sensor pod to a fuselage of an aircraft without creating a hole in the fuselage. For example, in some embodiments, a sensor pod mount may be removably mounted to an aircraft fuselage so that, after the sensor pod mount is removed from the fuselage, the aircraft is returned to a state that it was in prior to fitting the sensor pod mount to the aircraft. In some embodiments, the sensor pod mount may comprise a sensor pod mounting body, where the sensor pod mounting body includes a mounting region for removably mounting the sensor pod mount to the fuselage using a coupling that joins a strut to the fuselage.

Mounting the sensor pod to the aircraft without creating a hole in the fuselage may avoid or reduce the scope of regulatory approvals that may be needed before the sensor pod can be deployed. In some settings, once a sensor pod mount receives an approval for an aircraft type, the sensor pod mount may be deployed on a virtually unlimited number of aircraft of that type. For example, if one aircraft becomes unavailable, the sensor pod mount disclosed herein may be readily removed and retrofitted to a different aircraft of an approved type. Moreover, by mounting the sensor pod mount to the aircraft fuselage, the sensor pod mount may carry potentially larger loads relative to a mounting position more distant from fuselage 102. Further, mounting the sensor pod mount to the aircraft fuselage may reduce potential aerodynamic and flight dynamic effects caused by the load relative to some other mounting positions. In turn, it may be possible that more of the aircraft's original capabilities and maneuverability may be available relative to some other mounting positions.

FIG. 1 somewhat schematically shows an example aircraft 100 to which a sensor pod may be mounted using an embodiment of a sensor pod mount. Aircraft 100 includes a fuselage 102 and a wing 104. In the embodiment shown in FIG. 1, wing 104 is supported in part by a wing strut 106. As shown, one end of wing strut 106 is coupled to fuselage 102 at a strut attachment region 108 of fuselage 102, strut attachment region 108 being covered by a cowl 110. An opposite end of wing strut 106 (not shown) is coupled to wing 104. Aircraft 100 is illustrated as a general aviation aircraft having a high, fixed wing (e.g., an aircraft where a wing is mounted above the aircraft fuselage). For example, some embodiments may be employed with some aircraft sold under the trademark CESSNA (e.g., a CESSNA 152, 172, 182, 185, 206, 208, 208-B, 210, 336, and 337). However, it will be appreciated that embodiments of the sensor pod mount disclosed herein may be mounted to any suitable aircraft, including any suitable aircraft having a high, fixed wing. Further, it will be appreciated that differences among such aircraft may lead to variation among embodiments of the sensor pod mount from the illustrative examples disclosed herein.

Figure 2:
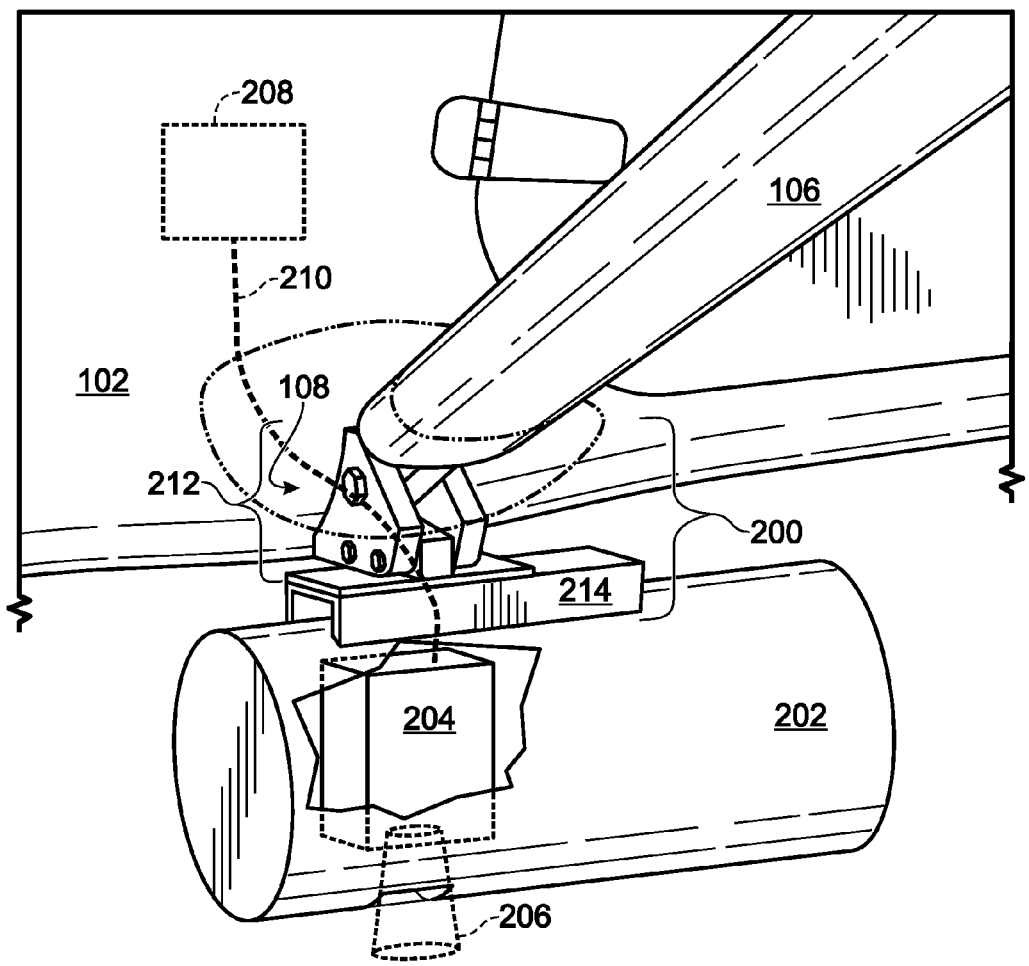
FIG. 2 somewhat schematically shows close up view of a portion of the aircraft fuselage shown in FIG. 1 at detail circle 2 to which an embodiment of a sensor pod mount is shown as being mounted.

FIG. 2 somewhat schematically shows a closer view (indicated by detail circle 2 in FIG. 1) of a portion of aircraft 100 shown in FIG. 1 to which an embodiment of a sensor pod mount 200 is mounted. Sensor pod mount 200 is configured to couple a sensor pod 202 to the aircraft. It will be appreciated that any suitable sensor pod 202 may be mounted to the aircraft using sensor pod mount 200. The embodiment shown in FIG. 2 includes a sensor 204 configured to collect data within a sensor collection region 206. For example, in some embodiments, sensor 204 may include an image capture device configured to collect RGB and/or IR image data within a field of regard, where the field of regard includes a field of view of the image capture device and a range of motion for sensor pod mount 200.

In the embodiment depicted in FIG. 2, sensor pod 202 and/or sensor 204 receives a power feed and/or control signals from a control unit 208 positioned inside of aircraft 100. Control unit 208 may include various logic and/or data-handling subsystems configured to control operation of sensor 204 and/or to obtain sensor data (e.g., image data) transferred from sensor 204. In some embodiments, control unit 208 may include a power supply for powering sensor 204 before or during aircraft engine start, after aircraft engine stop, or during any other suitable portion of aircraft and/or sensor operation.

Figure 3:
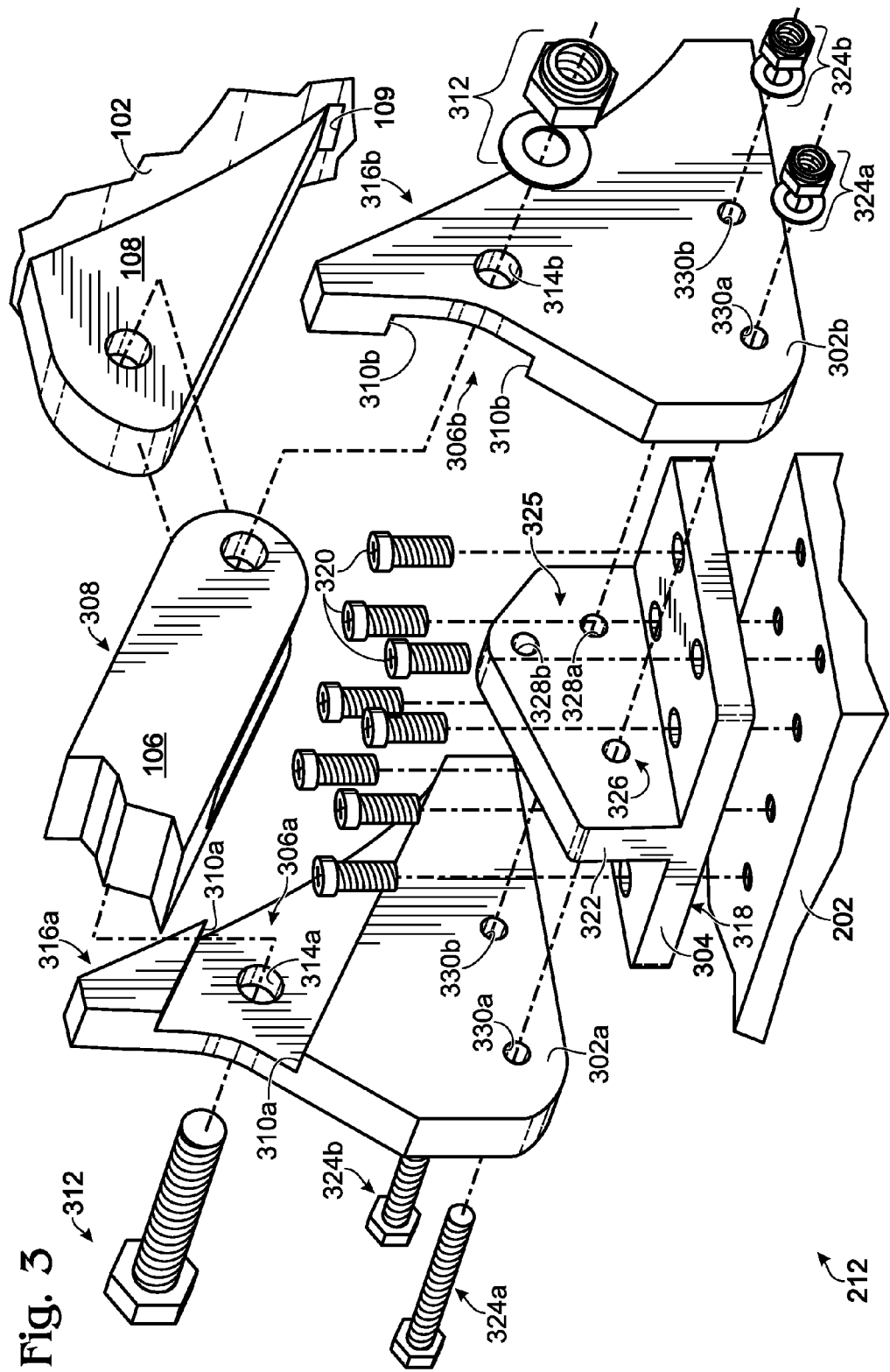
FIG. 3 somewhat schematically shows an exploded view of a sensor pod mounting body according to an embodiment of the present disclosure.

In some embodiments, one or more cables 210 may supply sensor 204 with a power feed from a power supply included in control unit 208 and/or a control signal from control unit 208. In some embodiments, cable 210 may communicate sensor data to control unit 208. Cable 210 may be arranged to pass through an existing opening in fuselage 102, so that no new openings are made in fuselage 102 during installation of cable 210. For example, FIG. 3 shows an opening 109 in fuselage 102 proximal to strut attachment region 108 through which one or more cables may be routed. Other examples of suitable openings through which one or more cables 210 may be routed include, but are not limited to, existing openings in aircraft doors and/or window panels, existing openings in fuselage 102 configured to route cables to external antennae and/or lights, and existing openings in fuselage 102 configured to route miscellaneous cables. Additionally or alternatively, it will be appreciated that, in some embodiments, sensor pod 202 may include suitable on-board power units, control units, and/or sensor data transfer units (e.g., image data transfer units) that operatively communicate with sensor 204 and/or control unit 208.

Sensor pod mount 200 includes a sensor pod mounting body 212 for coupling sensor pod 202 to an attachment position on fuselage 102. By coupling sensor pod mounting body 212 to fuselage 102, it may be possible to reduce aerodynamic and/or flight dynamic effects that may be imparted to aircraft 100 by sensor pod 202. It will be appreciated that any suitable attachment position of aircraft 100 may be used for coupling sensor pod mounting body 212 to fuselage 102. Such attachment positions may vary depending on the type and/or size of load carried by sensor pod mount 200, a type of sensor 204, and/or other sensor application considerations. In the embodiment shown in FIG. 2, sensor pod mounting body 212 is coupled to aircraft 100 at an attachment position where strut attachment region 108 of fuselage 102 joins a wing strut 106. Coupling sensor pod mounting body 212 to fuselage 102 at a location where wing strut 106 attaches to fuselage 102 may provide enhanced stability and/or payload capacity relative to scenarios where an external sensor or pod is mounted at a location on wing strut 106 that is closer to a wingtip than to fuselage 102. As another non-limiting example, in some embodiments, sensor pod mounting body 212 may be mounted to aircraft 100 at a position where a landing gear strut joins fuselage 102.

Sensor pod mounting body 212 is configured so that it may be attached to aircraft 100 without introducing or creating a new opening in fuselage 102. Fitting sensor pod mounting body 212 to aircraft 100 without creating a new hole in fuselage 102 may make it possible to retrofit any suitable existing aircraft 100 with an external sensor or pod, collect sensor data, and then remove the external sensor or pod and restore aircraft 100 to its original configuration. In the embodiment shown in FIG. 2, sensor pod mounting body 212 couples with fuselage 102 using existing openings in strut attachment region 108 and in wing strut 106. By using these existing openings, sensor pod mounting body 212 may be coupled to aircraft 100 using one or more couplings that configured to join together wing strut 106, fuselage 102, and sensor pod mounting body 212.

In some embodiments, sensor pod mount 200 may include an optional sensor pod adapter 214. Sensor pod adapter 214 includes a portion configured to interface with sensor pod mounting body 212 and another portion configured to interface with sensor pod 202. In some embodiments, sensor pod adapter 214 may be permanently mounted to sensor pod 202 by suitable welds, adhesives, or the like. In some other embodiments, sensor pod adapter 214 may be removably mounted to sensor pod 202 using any suitable connector for removably coupling sensor pod adapter 214 to sensor pod 202.

In the embodiment shown in FIG. 2, sensor pod adapter 214 includes a planar surface configured to interface with a complementary planar surface of sensor pod mounting body 212 and also includes structures configured to interface with a complementary non-planar surface sensor pod 202. Thus, potentially any suitable sensor pod 202 having any suitable external shape may be mounted to sensor pod mounting body 212 via a suitably configured sensor pod adapter 214. Alternatively, in some embodiments, sensor pod mounting body 212 may couple directly with sensor pod 202.

Sensor pod mount 200 may be formed from any suitable material or combination of materials. It will be appreciated that such materials and fabrication techniques may vary depending on a particular application for sensor pod mount 200. For example, in some embodiments, sensor pod mount 200 may be formed from aluminum via a suitable milling or casting technique. Other suitable materials include, but are not limited to, suitable steel alloys (e.g., stainless steel) and titanium.

Figure 4:
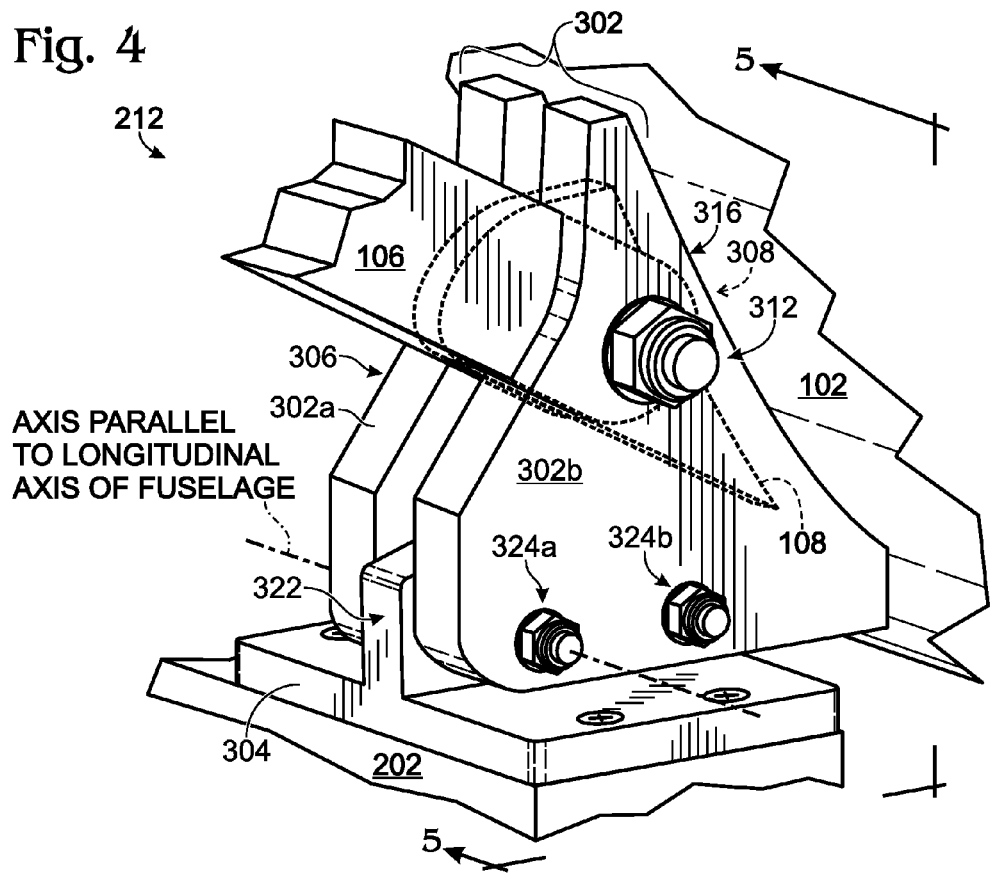
FIG. 4 somewhat schematically shows an assembled view of the embodiment depicted in FIG. 3.

FIG. 3 somewhat schematically shows an exploded view of an embodiment of a sensor pod mounting body 212 for mounting sensor pod 202 to fuselage 102 at a position where wing strut 106 is coupled to fuselage 102. In the embodiment shown in FIG. 3, wing strut 106 is configured to couple to fuselage 102 via a clevis-shaped strut connector region 308 adapted to couple with a tang-shaped strut attachment region 108. FIG. 4 somewhat schematically shows a perspective view of the embodiment shown in FIG. 3 in an assembled state, where sensor pod mounting body 212 is mounted to fuselage 102. The embodiment of sensor pod mounting body 212 depicted in FIG. 4 includes an aircraft interface structure 302 configured to interface with the attachment position of the aircraft and with a sensor pod interface structure 304.

In some embodiments, aircraft interface structure 302 may include two or more aircraft interface structure subunits, such as those shown at 302a and 302b in FIG. 3. In such embodiments, the aircraft interface structure subunits may be assembled to form the aircraft interface structure 302. This may provide a convenient approach for mounting and dismounting aircraft interface structure 302 to the attachment position of the aircraft. FIG. 4 shows an embodiment of aircraft interface structure 302 assembled from a plurality of aircraft interface subunits 302a and 302b.

Alternatively, in some embodiments, sensor pod mounting body 212 may include a single-unit aircraft interface structure. In some embodiments, a single-unit aircraft interface structure may be formed from a single piece of material. For example, a single-unit aircraft interface structure may be formed from just one aircraft interface structure subunit (like one shown at 302a or 302b in FIG. 3), or by forming aircraft interface structure 302 as shown in FIG. 4 from a single piece of material. In some other embodiments, a single-unit aircraft interface structure may be formed by permanently joining aircraft interface subunits into a single piece.

Aircraft interface structure 302 also includes a mounting region for removably mounting a sensor pod mount to a suitable attachment position of an aircraft. As shown in FIG. 4, aircraft interface structure 302 includes a mounting region 306 configured to couple with fuselage 102. In the embodiment shown in FIG. 3, aircraft interface structure subunits 302a and 302b are configured to form respective portions (shown at 306a and 306b in FIG. 3) of mounting region 306, so that mounting region 306 is formed between aircraft interface structure subunits 302a and 302b when coupled together into aircraft interface structure 302.

In some embodiments, mounting region 306 may include shaped engagement surfaces configured to provide some support for sensor pod mounting body 212 and/or to positively locate sensor pod mounting body 212 relative to the attachment position. In some embodiments, such engagement surfaces may be formed into aircraft interface structure 302 or into subunits thereof. Alternatively, in some embodiments, such engagement structures may be included in other structures that may be assembled to form mounting region 306. In the embodiment shown in FIG. 3, engagement surfaces 310a and 310b are formed into respective portions of aircraft interface structure subunits 302a and 302b. Engagement surfaces 310a and 310b form portions of a mounting region (shown in FIGS. 3 at 306a and 306b) configured to engage a strut connector region 308 of wing strut 106.

In some embodiments, mounting region 306 may be configured to cooperate with one or more couplings (such as nut-bolt-washer couplings, screws, clips, clamps, plug-and-socket couplings, adhesives, or the like) that join sensor pod mounting body 212 to the aircraft. For example, mounting region 306 may include suitable openings, tabs, and/or surfaces adapted to receive and/or engage a complementary coupling. In the embodiment shown in FIG. 3, mounting region portions 306a and 306b include respective holes 314a and 314b. Holes 314a and 314b are positioned so that coupling 312 may join them with complementary holes included in strut connector region 308 and strut attachment region 108. In the embodiment shown in FIG. 4, coupling 312 joins mounting region 306, strut connector region 308, and strut attachment region 108 together to couple aircraft interface structure 302 to fuselage 102.

In some embodiments, aircraft interface structure 302 may include one or more fuselage interface surfaces (shown at 316a and 316b in FIG. 3 and at 316 in FIG. 4). If included, fuselage interface surface 316 may help orient sensor pod mounting body 212 relative to fuselage 102. Additionally or alternatively, such fuselage interface surfaces 316 may help sensor pod mount 200 support some loads, such as torsional loads, which may be imparted by a sensor pod. Thus, in some embodiments, fuselage interface surface 316 may provide some support and/or stability for sensor pod mount 200 relative to schemes where the sensor pod or mount does not interface with the aircraft fuselage.

In the embodiment shown in FIG. 4, fuselage interface surfaces 316 are formed into a curve having similar shape as fuselage 102. Consequently, fuselage interface surfaces 316 may be mounted snugly against fuselage 102 when sensor pod mounting body 212 is fitted to the aircraft. It will be appreciated that fuselage interface surface 316 may include any suitably shaped surface configured to complement a shape of fuselage 102 in a vicinity of where sensor pod mounting body 212 is coupled to the aircraft. Non-limiting examples may include one or more single-radius surfaces, multi-radius surfaces, flat surfaces, or angled surfaces configured to engage with a complementary surface of fuselage 102. Further, though FIG. 4 shows fuselage interface surfaces 316 extending along an entire side of aircraft interface structure 302 facing fuselage 102, it will be appreciated that, in some embodiments, a fuselage interface surface 316 may occupy a sub-portion of a fuselage-facing portion of aircraft interface structure 302.

In some embodiments, an anti-chafing layer (not shown) may be included at one or more locations where sensor pod mounting body 212 engages with aircraft 100. In some scenarios, such anti-chafing layers may reduce or prevent potential abrasion between sensor pod mounting body 212 and aircraft 100. If included, any suitable material having a suitable coefficient of friction may be included in an anti-chafing layer. Polytetrafluoroethylene (PTFE) is one non-limiting example of an anti-chafing material that may be included in an anti-chafing layer.

If included, an anti-chafing layer may be permanently or temporarily bonded or adhered to any suitable surface. For example, in some embodiments, an adhesive tape including anti-chafing material may be adhered to portions of one or more of engagement surfaces 310a and 310b and/or portions of strut connector region 308. Additionally or alternatively, in some embodiments, an adhesive tape including anti-chafing material may be adhered to one or more of fuselage interface surfaces 316a and 316b and fuselage 102.

Additionally or alternatively, an optional shim layer may be included at one or more locations where sensor pod mounting body 212 engages with aircraft 100 in some embodiments. If included, the optional shim layer may help to close gaps and may potentially damp vibrational forces between aircraft 100 and sensor pod mounting body 212. For example, a suitable shim layer may be provided between portions of engagement surfaces 310a and 310b and strut connector region 308. Any suitable shim material may be included in a shim layer. One non-limiting example shim layer includes an adhesive-backed aluminum foil used to temporarily shim gaps. It will be appreciated that in some embodiments, a shim layer may also act as an anti-chafing layer.

Sensor pod interface structure 304 is configured to couple a sensor pod (in some embodiments, via a sensor pod adapter like that shown at 214 in FIG. 2) to sensor pod mounting body 212 at a sensor pod mounting surface 318. It will be appreciated that sensor pod mounting surface 318 may have any suitable shape. In the embodiment shown in FIG. 3, sensor pod mounting surface 318 includes a planar surface to which a complementary mating surface of sensor pod 202 may be attached using a plurality sensor pod couplings 320 (such as nut-bolt-washer couplings, screws, clips, clamps, plug-and-socket couplings, adhesives, or the like). However, in some embodiments, sensor pod mounting surface 318 may have a non-planar shape to which suitably shaped mating surface of a sensor pod or sensor pod adapter 214 may be coupled. Non-limiting examples of such non-planar surfaces may include various curves or angled surfaces. Further, in some embodiments, sensor pod mounting surface 318 may include one or more orientation structures, such as projections and/or openings adapted to orient a structure being coupled to sensor pod mounting surface 318 in a preselected manner.

In some embodiments, sensor pod interface structure 304 may be configured to be removably coupled to aircraft interface structure 302 using a coupling structure or surface configured to interface with one or more complementary structures or surfaces included in aircraft interface structure 302. This may permit fast swaps between different sensor pods to which respective sensor pod interface structures 304 have been pre-installed. Further, this approach may permit variation in orientation of the sensor pod with respect to the aircraft as described in more detail below.

For example, FIGS. 3 and 4 show an embodiment of a coupling structure for coupling sensor pod interface structure 304 to aircraft interface structure 302 in the form of a tab 322 configured to be mounted between aircraft interface structure subunits 302a and 302b. As shown in FIG. 3, tab 322 may be coupled to aircraft interface structure subunits 302a and 302b using a plurality of complementary couplings (shown as 324a and 324b in FIGS. 3 and 4). Non-limiting examples of such couplings include nut-bolt-washer couplings, screws, clips, clamps, plug-and-socket couplings, temporary adhesives, and the like.

In some embodiments, an angular orientation between the aircraft interface structure 302 and sensor pod interface structure 304 may be adjustable. For example, sensor pod interface structure 304 may be configured to cooperate with aircraft interface structure 302 so that an angle formed between a first plane tangent to sensor pod mounting surface 318 and a second plane tangent to fuselage interface surface 316 is adjustable. This may allow sensor collection region 206 to be adjusted to collect sensor data at a selected angle. For example, an image collection sensor pod may first be oriented to collect image data from an area directly below the aircraft (e.g., a nadir photograph) and then adjusted to collect image data from a different angle (e.g., an oblique photograph). The collected image data may be used to generate a set of image data in which geometric distortions, terrain distortions, and other distortions may be adjusted to generate an image having uniform scaling (e.g., an orthophoto). In some settings, the ability to adjust the angular orientation of the sensor pod relative to the aircraft fuselage may allow changes to the sensor collection region 206 without dismounting and remounting the sensor pod. Such approaches may speed data collection.

For example, FIGS. 3 and 4 show an embodiment of an angular adjuster 325 for adjusting an angular orientation of sensor pod interface structure 304 about an axis parallel to a longitudinal axis (e.g., a roll axis) of fuselage 102. As shown in FIG. 3, angular adjuster 325 includes a pivot opening 326 and a plurality of angular selection openings (shown at 328a and 328b in FIG. 3) included in tab 322. In the embodiment illustrated in FIG. 3, aircraft interface structure subunits 302a and 302b, sensor pod interface structure 304, and couplings 324a and 324b cooperate with angular adjuster 325 to set the angular orientation of sensor pod interface structure 304. For example, in the embodiment shown in FIG. 3, a first coupling 324a, a first pair of openings 330a, and pivot opening 326 may be assembled to form a pivot for angular adjuster 325.

In the embodiment shown in FIG. 3, angular adjuster 325 includes a pair of angular selection openings 328a and 328b. Selection of a particular angular selection opening may be used to set a respective angular orientation. For example, in the embodiment shown in FIG. 3, a particular angular orientation may be selected by rotating sensor pod interface structure 304 about pivot opening 326 so that a particular angular selection opening is aligned with a second pair of openings 330b. A second coupling 324b may then be inserted through openings 330b and the particular angular selection opening to secure sensor pod mounting body 212 at the selected angular orientation.

Figure 5:
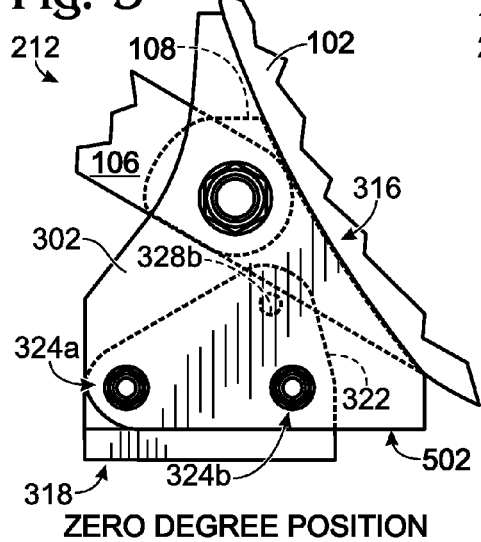
FIG. 5 somewhat schematically shows an elevation view along line 5-5 of FIG. 4 depicting a sensor pod mounting surface of the sensor pod mounting body that is mounted at a first angular orientation relative to a fuselage interface surface of the sensor pod mounting body.
Figure 6:
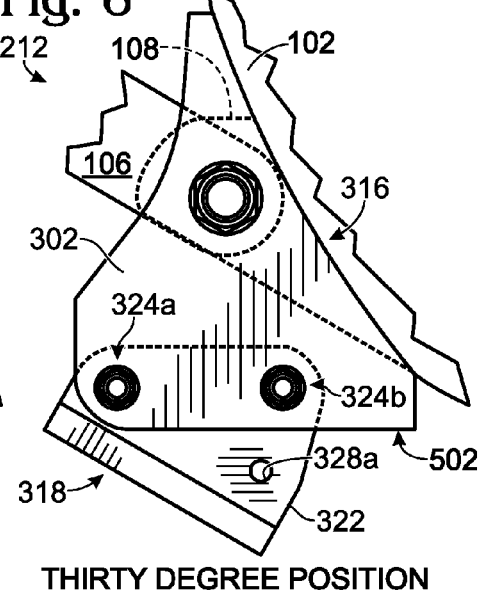
FIG. 6 somewhat schematically shows another elevation view along line 5-5 of FIG. 4 depicting a sensor pod mounting surface of the sensor pod mounting body that is mounted at a different angular orientation than that shown in FIG. 5.

For example, FIG. 5 somewhat schematically shows a side view of an embodiment of sensor pod mounting body 212 viewed along line 5-5 of the embodiment shown in FIG. 4 in a first angular orientation. As shown in FIG. 5, sensor pod interface structure 304 is coupled to aircraft interface structure 302 at pivot opening 326 and angular selection opening 328a with couplings 324a and 324b, respectively. As a result, sensor pod mounting surface 318 is positioned at an angle of zero degrees with respect to a bottom surface 502 of aircraft interface structure 302. Subsequent angular adjustments may be made by removing coupling 324b, selecting a new angular orientation by aligning a different angular selection opening with openings 330b, and replacing coupling 324b. For example, FIG. 6 somewhat schematically shows a side view of an embodiment of sensor pod mounting body 212 viewed along line 5-5 of the embodiment shown in FIG. 4 in a different angular orientation from that shown in FIG. 5. As shown in FIG. 6, sensor pod interface structure 304 is coupled to aircraft interface structure 302 at pivot opening 326 and angular selection opening 328b with couplings 324a and 324b, respectively. As a result, sensor pod mounting surface 318 is positioned at an angle of −30 degrees with respect to bottom surface 502 of aircraft interface structure 302.

It will be appreciated that any suitable number of angular selection openings may be included in angular adjuster 325 without departing from the scope of the present disclosure. For example, in some embodiments, three or more angular selection openings may be included, while in some other embodiments, a single angular selection opening may be included. Further, it will be appreciated that such openings may be provided so that any suitable angular orientation may be selected. In some embodiments, angular selection openings may be provided at any suitable spacing along a constant radius arc having a center at pivot opening 326. For example, in one scenario, angular selection openings may be provided at five degree intervals along such an arc. In another scenario, angular selection openings may be provided at irregular positions corresponding to selected angular orientations (for example, at 0-degree, −10-degree, −30-degree, and −45-degree positions with respect to a plane parallel to sensor pod mounting surface 318) along such an arc. Further, while the angular selection openings depicted in FIG. 3 are generally circular in shape, it will be appreciated that any suitable shape may be employed. In some embodiments, one or more angular selection openings may be provided with an arcuate shape, such as a curved slot positioned at a constant radius from pivot opening 326, as a curved slot may provide virtually infinite angular adjustment resolution within a range of angles described by the slot.

While the description above relates to a sensor pod mounting body 212 comprising a sensor pod interface structure 304 that is separable from an aircraft interface structure 302, it will be appreciated that any suitable configuration of structures for coupling the sensor pod mount to a sensor pod and to the aircraft fuselage may be employed without departing from the scope of the present disclosure. In some embodiments, a single-unit sensor pod mounting body may be created by forming sensor pod interface structure 304 in a single piece with an aircraft interface structure 302 or by permanently joining such pieces into a single unit. In such embodiments, sensor pod mounting body 212 may include a fuselage interface surface 316 on one surface and a sensor pod mounting surface 318 on a different surface.

FIG. 7 shows a flowchart for an embodiment of a method 700 of installing a removable sensor pod mount on an aircraft. It will be appreciated that the methods described herein are provided for illustrative purposes and are not intended to be limiting. Accordingly, it will be appreciated that in some embodiments the methods described herein may include additional or alternative processes, and in some embodiments, the methods described herein may include some processes that may be reordered or omitted without departing from the scope of the present disclosure. Further, it will be appreciated that the methods described herein may be performed using any suitable hardware including the hardware described herein.

At 702, method 700 includes uncoupling a strut from a fuselage of the aircraft at a strut attachment region where the strut joins the fuselage. In some embodiments, uncoupling the strut at 702 may include removing various cowls or fairings covering a location where the strut is attached to the fuselage. Further, in some embodiments uncoupling the strut at 702 may include removing one or more couplings that join the strut to the fuselage.

At 704, method 700 includes mounting a sensor pod mount to an attachment position of the aircraft so that, during an initial installation of the sensor pod, the sensor pod mount may be removably coupled to the fuselage without creating a hole in the fuselage. In some embodiments, the sensor pod mount may be mounted to the fuselage at a strut attachment region using one or more couplings that join the strut to the fuselage so that the sensor pod mount, the strut, and the fuselage are joined by the coupling(s). In some of such embodiments, mounting the sensor pod mount to the fuselage may include reinstalling an original coupling to couple the sensor pod mount to the strut and the fuselage, while in some other of such embodiments, a new coupling may be installed to join the sensor pod mount to the strut and the fuselage.

In some embodiments, mounting the sensor pod mount to the fuselage at 704 may include, at 706, mounting an aircraft interface structure to the fuselage. For example, the aircraft interface structure may be mounted to the fuselage at the strut attachment region using at a mounting region of the aircraft interface structure. In some of such embodiments, mounting the aircraft interface structure to the fuselage may include placing a fuselage interface surface of the aircraft interface structure adjacent the fuselage. This may help orient the aircraft interface structure relative to the fuselage. Additionally or alternatively, in some embodiments, mounting the aircraft interface structure to the fuselage may include engaging one or more portions of the mounting region to one or more complementary portion of the strut and/or strut attachment region of the fuselage. This may help align the mounting region of the aircraft interface structure to a location where the strut and strut attachment region were originally coupled, and may ease coupling of the mounting region to the fuselage at that location.

In some embodiments, mounting the sensor pod mount to the fuselage at 704 may include, at 708, mounting the sensor pod to a sensor pod mounting surface of a sensor pod mounting structure, and, at 710, coupling the sensor pod mounting structure to the aircraft interface structure. In some embodiments, mounting the sensor pod to the sensor pod mounting surface may include mounting a sensor pod adapter to the sensor pod and then mounting the sensor pod adapter to the sensor pod mounting surface.

In some embodiments, mounting the sensor pod mount to the fuselage at 704 may include, at 712, adjusting an angular orientation between the aircraft interface structure and the sensor pod interface structure. For example, adjusting an angular orientation may include adjusting a sensor pod mounting surface of the sensor pod interface structure about an axis parallel to a longitudinal axis of the fuselage. In some embodiments, adjusting the angular orientation may include selecting an angular orientation for the sensor pod interface structure and then securing the selected angular orientation. In some embodiments, the selected angular orientation may be secured by installing one or more couplings that join the aircraft interface structure to the sensor pod interface structure at the selected angular orientation.

At 714, method 700 comprises connecting the sensor pod to a control unit positioned inside the aircraft without creating a hole in the fuselage. For example, the sensor pod may be connected to a control unit via an existing opening in the fuselage during an initial installation of the sensor pod so that a new opening is not created in the fuselage. In some embodiments, connecting the sensor pot to the control unit may include providing a control feed, a sensor data transfer feed, and/or a power feed that passes through a suitable existing opening of the fuselage.

Consequently, by coupling with the fuselage at an existing attachment point of the fuselage, the hardware and methods described herein may offer enhanced aircraft capability and sensor pod load carrying ability relative to scenarios where the sensor pod or sensor pod mount is attached to another portion of the aircraft, such as a wing, a step, or the like. Further, by coupling with the fuselage without creating a new opening in the fuselage, the hardware and methods described herein may provide comparatively more flexibility in retrofitting an existing aircraft and returning it to an initial configuration, which may lead to enhance fleet utilization relative to schemes where the fuselage is modified by creating a new holes therein during installation of the sensor pod or sensor pod mount.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A sensor pod mount for mounting a sensor pod to a fuselage of an aircraft through an existing strut connector region of an existing wing strut, the sensor pod mount comprising a sensor pod mounting body, the sensor pod mounting body including a mounting region with holes positioned to engage with complimentary holes in the strut connector region for removably mounting the sensor pod mount to the fuselage using a coupling that joins a wing strut to the fuselage and where the mounting region includes a curved engagement surface complementing a surface of the fuselage and an engagement surface connecting the wing strut to the fuselage.

2. The sensor pod mount of claim 1, where the sensor pod mounting body comprises:
   a fuselage interface surface for orienting the sensor pod mounting body relative to the fuselage on one surface of the sensor pod mounting body; and
   a sensor pod mounting surface on a different surface of the sensor pod mounting body.

3. The sensor pod mount of claim 2, where an angular orientation of the sensor pod mounting surface is adjustable about an axis parallel to a longitudinal axis of the fuselage.

4. The sensor pod mount of claim 1, where the sensor pod mounting body comprises:
   an aircraft interface structure including a fuselage interface surface for orienting the sensor pod mounting body relative to the fuselage; and
   a sensor pod interface structure removably coupled to the aircraft interface structure, the sensor pod interface structure including a sensor pod mounting surface,
   where the aircraft interface structure includes the mounting region.

5. The sensor pod mount of claim 4, where the aircraft interface structure comprises two or more aircraft interface structure subunits that form the mounting region.

6. The sensor pod mount of claim 5, where a coupling structure of the sensor pod interface structure is positioned between at least a pair of the aircraft interface structure subunits when the sensor pod interface structure is removably coupled to the aircraft interface structure.

7. The sensor pod mount of claim 4, where an angular orientation of the sensor pod mounting surface is adjustable about an axis parallel to a longitudinal axis of the fuselage.

8. The sensor pod mount of claim 7, further comprising an angular adjuster for adjusting the angular orientation, the angular adjuster being configured to couple the aircraft interface structure to the sensor pod interface structure at a selected angular setting.

9. A sensor pod mounting system for mounting a sensor pod to a fuselage of an aircraft, the system comprising:
   a sensor pod; and
   a sensor pod mount substantially triangular-shaped comprising a fuselage interface which includes a curved engagement surface to complement a shape of the fuselage on one surface of the sensor pod mount and an engagement surface connecting the wing strut to the fuselage, a sensor pod mounting surface being directly attached to a sensor pod mounting body and the sensor pod mounting body being directly attached to a sensor pod, and a mounting region for joining the sensor pod mount to an aircraft fuselage, the mounting region including an engagement surface to engage a strut connector region of a wing strut or a landing gear strut to couple the sensor pod mount to the aircraft fuselage using an existing strut attachment region on the aircraft fuselage so that, during an initial installation of the sensor pod, the sensor pod mount may be removably coupled to the aircraft without creating a hole in the aircraft fuselage.

10. The sensor pod mounting system of claim 9, further comprising:
    a power feed configured to supply power to the sensor pod from a power supply positioned inside the aircraft via an existing opening in the aircraft fuselage; and
    a sensor pod adapter configured to couple the sensor pod to the sensor pod mounting surface.

11. The sensor pod mounting system of claim 9, where an angular orientation of the sensor pod mounting surface is adjustable about an axis parallel to a longitudinal axis of the fuselage.

12. The sensor pod mounting system of claim 9, where the sensor pod mount comprises an aircraft interface structure and a sensor pod interface structure coupled to the aircraft interface structure.

13. The sensor pod mounting system of claim 12, where the aircraft interface structure comprises two or more aircraft interface structure subunits that form the mounting region when the aircraft interface structure subunits are coupled together.

14. The sensor pod mounting system of claim 12, further comprising an angular adjuster, the angular adjuster being configured to couple the aircraft interface structure to the sensor pod interface structure at a selected angular setting.

15. The sensor pod mounting system of claim 9, where the mounting region is coupled to the aircraft at a strut attachment region where a strut joins the aircraft fuselage.

16. A method of removably installing a sensor pod on an aircraft, the method comprising:
    uncoupling a strut from a fuselage of the aircraft at a strut attachment region where the strut joins the fuselage;
    mounting a sensor pod mount to the aircraft at the strut attachment region using a coupling that joins the strut to the fuselage wherein the coupling includes a sensor pod mounting body that is directly attached to the sensor pod mount so that the sensor pod mount, the strut, and the fuselage are joined by the coupling;
    including a mounting region with holes positioned to engage with complimentary holes in the strut attachment region and mounting the sensor pod to the sensor pod mount.

17. The method of claim 16, where mounting the sensor pod mount to the aircraft comprises:
    mounting an aircraft interface structure included in the sensor pod mount to the aircraft at a mounting region of the aircraft interface structure, the mounting region being configured to cooperate with the coupling so that, during an initial installation of the sensor pod, the sensor pod mount may be removably coupled to the aircraft without creating a hole in the fuselage; and
    coupling the aircraft interface structure to a sensor pod interface structure including a sensor pod interface surface for mounting the sensor pod to the sensor pod interface structure.

18. The method of claim 17, where mounting the sensor pod mount to the aircraft comprises adjusting an angular orientation between the aircraft interface structure and the sensor pod interface structure.

19. The method of claim 16, further comprising, during an initial installation of the sensor pod, connecting the sensor pod to a power supply positioned inside the aircraft via an existing opening in the fuselage.

* * * * *